(12) United States Patent
Jaggi et al.

(10) Patent No.: US 11,586,159 B2
(45) Date of Patent: Feb. 21, 2023

(54) MACHINE LEARNING METHOD AND SYSTEM FOR EXECUTING REMOTE COMMANDS TO CONTROL FUNCTIONS OF A VEHICLE

(71) Applicant: GM GLOBAL TECHNOLOGY OPERATIONS LLC, Detroit, MI (US)

(72) Inventors: Kunal Jaggi, Troy, MI (US); Anurag Goyal, Plymouth, MI (US); Bhargavi Sarma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1054 days.

(21) Appl. No.: 16/259,804

(22) Filed: Jan. 28, 2019

(65) Prior Publication Data

US 2020/0241484 A1 Jul. 30, 2020

(51) Int. Cl.
*G05B 13/02* (2006.01)
*G06N 20/00* (2019.01)
(Continued)

(52) U.S. Cl.
CPC ..... *G05B 13/0265* (2013.01); *B60H 1/00735* (2013.01); *B67D 7/08* (2013.01); *G06N 20/00* (2019.01)

(58) Field of Classification Search
CPC ............ B60H 1/00657; B60H 1/00778; B60H 1/0073; B60H 1/00735; B60H 1/00; B60H 1/00807; B60H 1/00878; B67D 7/08; G05B 13/0265; G05B 13/02; G06N 20/00; H04W 4/50; H04W 4/38; H04W 4/30; H04W 4/44; H04W 4/70; H04W 4/18; H04W 4/029; H04W 4/185; H04W 12/42; H04W 12/104; H04W 72/121; H04W 88/02; H04W 88/04; H04W 4/80; H04W 92/18; G06K 9/00; G06K 19/077; G06K 9/00671; G06K 19/007707; G06K 7/1093; G06K 9/00624;
(Continued)

(56) References Cited

U.S. PATENT DOCUMENTS 10,846,960 B1 * 11/2020 Lemberger et al. ..........................
G07C 9/00896
2010/0235046 A1 * 9/2010 Proefke et al. .................. 701/36
(Continued)

FOREIGN PATENT DOCUMENTS

| CN | 108749596 A | * | 11/2018 | ......... B60H 1/00642 |
| EP | 3582030 A1 | * | 12/2019 | ............. G05B 13/02 |
| WO | WO 2020020464 A1 | * | 1/2020 | ............. G06Q 10/06 |

*Primary Examiner* — Meless N Zewdu
(74) *Attorney, Agent, or Firm* — Lorenz & Kopf LLP (57) ABSTRACT

In an exemplary embodiment, a vehicle system is provided that includes a sensor, a memory, and a processor. The sensor is configured to at least facilitate obtaining vehicle data pertaining to one or more conditions of the vehicle. The memory is configured to at least facilitate storing historical data pertaining to a user's operation of the vehicle. The processor is coupled to the sensor and the memory, and is configured to at least facilitate: (i) generating one or more predictions of one or more needs for the user, using the vehicle data and the historical data as inputs for a machine learning model; and (ii) providing instructions to implement a vehicle action that accomplishes the one or more needs for the user based on the generated predictions via the machine learning model.

18 Claims, 2 Drawing Sheets

(51) Int. Cl.
*B60H 1/00* (2006.01)
*B67D 7/08* (2010.01)

(58) Field of Classification Search
CPC ........... G06Q 30/0639; G06Q 30/0621; G06Q 10/087; G06Q 10/00; G06Q 10/02; G06Q 10/025; G06Q 10/0833; G06T 7/00; G06T 9/00; G06T 19/00; G06F 16/50; H04L 12/1831; G08B 13/2462; G08B 13/2402; G08B 13/2485
See application file for complete search history.

(56) References Cited

U.S. PATENT DOCUMENTS

| | | | |
|---|---|---|---|
| 2016/0053699 A1* | 2/2016 | Ozkan | F02D 41/042 |
| 2019/0215378 A1* | 7/2019 | Munishwar et al. | H04L 67/2847 |

* cited by examiner

MACHINE LEARNING METHOD AND SYSTEM FOR EXECUTING REMOTE COMMANDS TO CONTROL FUNCTIONS OF A VEHICLE

The technical field generally relates to vehicles, and more particularly relates to remote commands for vehicles.

Certain vehicles today provide for remote commands, for example with remote starting of the vehicle. It may be desirable to further improve remote commands for vehicles, for example based on the vehicle's circumstances.

Accordingly, it may be desirable to provide improved methods and systems for executing remote commands for vehicles. Furthermore, other desirable features and characteristics of the present invention will become apparent from the subsequent detailed description of the invention and the appended claims, taken in conjunction with the accompanying drawings and this background of the invention.

SUMMARY

In one exemplary embodiment, a method is provided. The method includes: (i) obtaining vehicle data pertaining to one or more conditions of a vehicle; (ii) obtaining historical data pertaining to a user's operation of the vehicle; (iii) generating one or more predictions of one or more needs for the user, via a processor, using the vehicle data and the historical data as inputs for a machine learning model; and (iv) providing instructions, via the processor, to implement a vehicle action that accomplishes the one or more needs for the user based on the generated predictions via the machine learning model.

Also in one embodiment, (i) the step of obtaining historical data includes obtaining a driving history for the user; (ii) the step of generating one or more predictions includes predicting when the user will next be using the vehicle, based on the driving history; and (iii) the step of providing instructions includes providing the instructions, to implement the vehicle action, about when it is predicted that the user will next be using the vehicle.

Also in one embodiment, the step of providing instructions includes providing instructions for starting an engine of the vehicle and controlling an environmental control system for the vehicle, about when it is predicted that the user will next be using the vehicle.

Also in one embodiment, the step of obtaining the vehicle data includes: (i) obtaining an external temperature that is external to the vehicle; and (ii) the step of providing instructions includes providing instructions for starting the engine of the vehicle and controlling the environmental control system for the vehicle to attain a desired temperature inside the vehicle based on the external temperature, about when it is predicted that the user will next be using the vehicle.

Also in one embodiment, the method further includes determining whether the vehicle is disposed inside a garage, based on the vehicle data; wherein the step of providing instructions includes providing instructions for starting the engine of the vehicle and controlling the environmental control system for the vehicle, only if the vehicle is not disposed inside the garage.

Also in one embodiment, the method further includes: (i) determining a target destination for the vehicle; (ii) determining, using the vehicle data, whether a particular vehicle action is required for the vehicle to reach the target destination; and (iii) providing a notification, to the user, recommending performance of the vehicle action, when it is determined that the particular vehicle action is required for the vehicle to reach the target destination.

Also in one embodiment, the step of determining the target destination includes determining the target destination based on the historical data.

Also in one embodiment, (i) the step of determining whether the vehicle action is required includes determining whether a fuel refill is required for the vehicle to reach the target destination; and (ii) the step of providing the notification includes notifying the user that the fuel refill is recommended, when it is determined that the fuel refill is required for the vehicle to reach the target destination.

Also in one embodiment, (i) the step of determining whether the vehicle action is required includes determining whether a battery charge is required for the vehicle to reach the target destination; and (ii) the step of providing the notification includes notifying the user that the battery charge is recommended, when it is determined that the battery charge is required for the vehicle to reach the target destination.

In another exemplary embodiment, a system includes: (i) a data module and a processing module. The data module is configured to at least facilitate: (a) obtaining vehicle data pertaining to one or more conditions of a vehicle; and (b) obtaining historical data pertaining to a user's operation of the vehicle; and (ii) a processing module that is coupled to the data module and configured to at least facilitate, via a processor: (a) generating one or more predictions of one or more needs for the user, via a processor, using the vehicle data and the historical data as inputs for a machine learning model; and providing instructions, via the processor, to implement a vehicle action that accomplishes the one or more needs for the user based on the generated predictions via the machine learning model.

Also in one embodiment, (i) the data module is configured to at least facilitate obtaining a driving history for the user; and (ii) the processing module is configured to at least facilitate: (a) predicting when the user will next be using the vehicle, based on the driving history; and (b) providing the instructions, to implement the vehicle action, about when it is predicted that the user will next be using the vehicle.

Also in one embodiment, the processing module is configured to at least facilitate providing instructions for starting an engine of the vehicle and controlling an environmental control system for the vehicle, about when it is predicted that the user will next be using the vehicle.

Also in one embodiment, (i) the data module is configured to at least facilitate obtaining an external temperature that is external to the vehicle; and (ii) the processing module is configured to at least facilitate providing instructions for starting the engine of the vehicle and controlling the environmental control system for the vehicle to attain a desired temperature inside the vehicle based on the external temperature, about when it is predicted that the user will next be using the vehicle.

Also in one embodiment, the processing module is configured to at least facilitate: (i) determining whether the vehicle is disposed inside a garage, based on the vehicle data; and (ii) providing instructions for starting the engine of the vehicle and controlling the environmental control system for the vehicle, only if the vehicle is not disposed inside the garage.

Also in one embodiment, the processing module is configured to at least facilitate: (i) determining a target destination for the vehicle; (ii) determining, using the vehicle data, whether a particular vehicle action is required for the vehicle to reach the target destination; and (iii) providing a notification, to the user, recommending performance of the vehicle action, when it is determined that the particular vehicle action is required for the vehicle to reach the target destination.

Also in one embodiment, the processing module is configured to at least facilitate determining the target destination based on the historical data.

Also in one embodiment, the processing module is configured to at least facilitate: (i) determining whether a fuel refill is required for the vehicle to reach the target destination; and (ii) notifying the user that the fuel refill is recommended, when it is determined that the fuel refill is required for the vehicle to reach the target destination.

Also in one embodiment, the processing module is configured to at least facilitate: (i) determining whether a battery charge is required for the vehicle to reach the target destination; and (ii) notifying the user that the battery charge is recommended, when it is determined that the battery charge is required for the vehicle to reach the target destination.

In another exemplary embodiment, a vehicle system is provided that includes a sensor, a memory, and a processor. The sensor is configured to at least facilitate obtaining vehicle data pertaining to one or more conditions of the vehicle. The memory is configured to at least facilitate storing historical data pertaining to a user's operation of the vehicle. The processor is coupled to the sensor and the memory, and is configured to at least facilitate: (i) generating one or more predictions of one or more needs for the user, using the vehicle data and the historical data as inputs for a machine learning model; and (ii) providing instructions to implement a vehicle action that accomplishes the one or more needs for the user based on the generated predictions via the machine learning model.

Also in one embodiment, (i) the memory is configured to at least facilitate storing a driving history for the user; and (ii) the processor is configured to at least facilitate: (a) predicting when the user will next be using the vehicle, based on the driving history; and (b) providing instructions for starting an engine of the vehicle and controlling an environmental control system for the vehicle, about when it is predicted that the user will next be using the vehicle, about when it is predicted that the user will next be using the vehicle.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
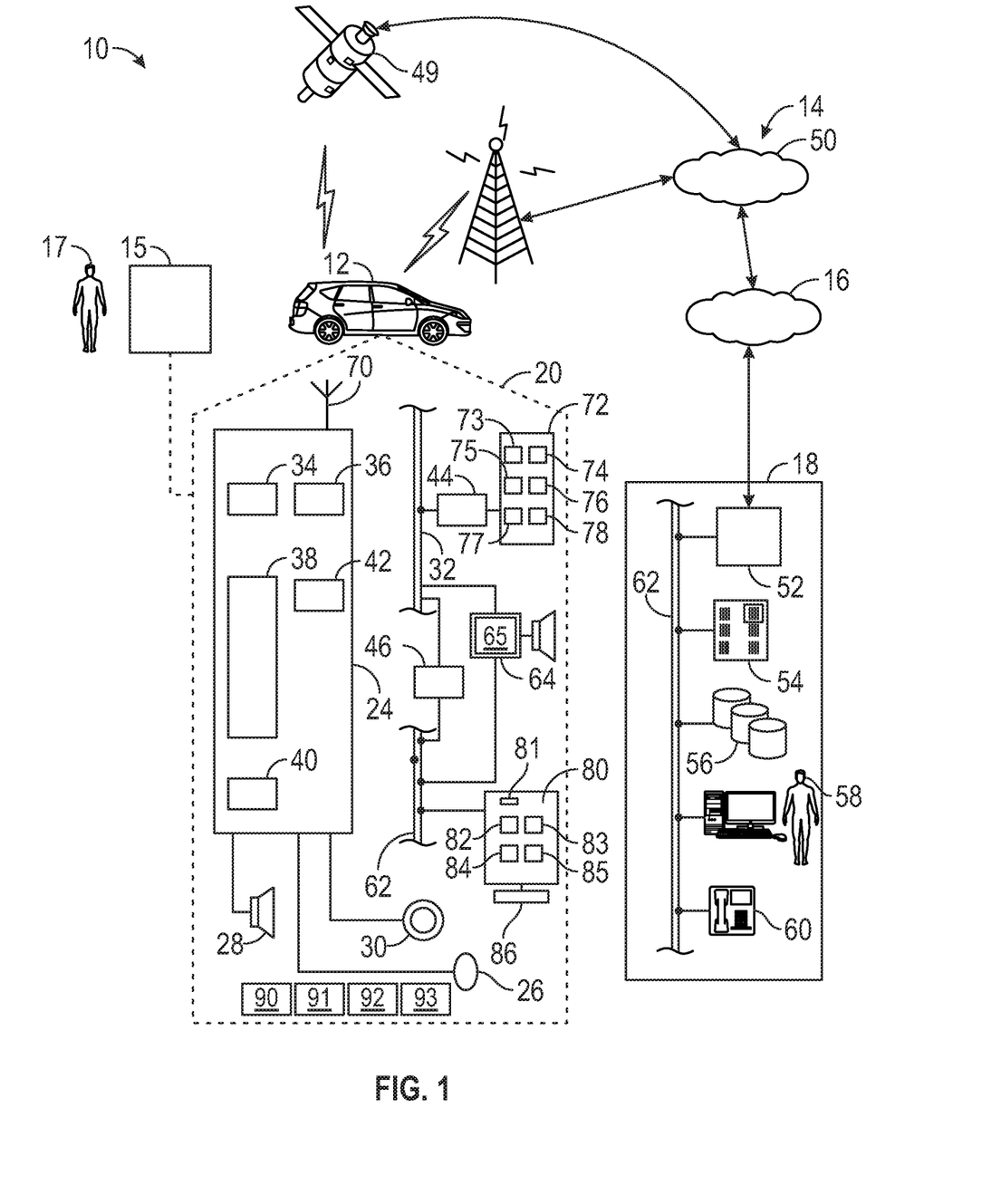
FIG. 1 is a functional block diagram of a communications system that includes a vehicle, and that is configured to execute remote commands for the vehicle, in accordance with exemplary embodiments.

FIG. 1 is a functional block diagram of a communications system 10, in accordance with an exemplary embodiment. As described in greater detail further below, the communications system 10 generally includes a vehicle 12, along with one or more wireless carrier systems 14, one or more land networks 16, and one or more remote servers 18. As described in greater detail further below, in various embodiments, the communications system 10 provides remote commands for the vehicle 12 based on machine learning predictions.

It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

In various embodiments, each vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. In various embodiments, the vehicle 12 has an engine (or motor) 90, and runs using fuel 91 (e.g., gasoline, diesel, or other fuel), oil 92, and one or more batteries 93. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including providing remote commands for the vehicle 12 based on machine learning predictions. In various embodiments, the electronic device 15 may include a vehicle keyfob. In certain other embodiments, the device 15 may include, by way of example, various other different consumer electronic/mobile devices, such as a mobile phone, a laptop, a smart wearable device, a tablet computer, a network computer, and/or one or more other electronic devices and/or combinations thereof.

In various embodiments, the telematics unit 24 receives data pertaining to the vehicle 12 and its surroundings, along with historical data pertaining to a user 17's operation of the vehicle 12, and provides remote commands for the vehicle 12 based on machine learning predictions. In various embodiments, the telematics 24 obtains vehicle data from the user 17's electronic device, along with various sensors 72 of or around the vehicle 12.

In various embodiments, the telematics unit 24 detects and communicates with the electronic device 15 while connected to a wireless network within a wireless range of the vehicle 12. In various embodiments, the telematics unit 24 and the electronic device 15 exchange data (either directly and/or indirectly via the remote server 18), including the exchange of an identifier of the electronic device 15, for identification of the electronic device 15 and/or the user 17 thereof, along with the transfer of data pertaining to the vehicle 12 (e.g., pertaining to user 17 inputs).

Also in various embodiments, the telematics unit 24 also obtains vehicle-related information from various vehicle sensors 72, connected to various sensor interface modules 44 are operatively connected to the vehicle bus 32. In various embodiments, the vehicle sensors 72 include detection sensors 73, user input sensors 74, fuel sensor 75, oil sensors 76, temperature sensor 77, and voltage sensors 78, described below. In various embodiments, the vehicle sensors 72 may also include any number of other sensors, such as by way of example, wheel speed sensors, accelerometers, steering angle sensors, braking system sensors, gyroscopes, magnetometers, emission detection, and/or control sensors, and the like. Example sensor interface modules 44 include powertrain control, climate control, and body control, to name but a few.

In various embodiments, the detection sensors 73 detect and communicate with the user 17's electronic device 15. For example, in various embodiments, the detection sensors 73 detect the electronic device 15 and receive a unique identifier thereof in order to help identify the user 17 of the vehicle 12. In certain embodiments, the detection sensors 73 include one or more Bluetooth low energy (BLE) sensors 73 that are disposed within or on the vehicle 12 (e.g., on or within the body 19 of the vehicle 12). In certain embodiments, the detection sensors 73 are utilized in connection with one or more short-range wireless connection (SRWC) protocols (e.g., Bluetooth/Bluetooth Low Energy, or Wi-Fi).

Also in various embodiments, the input sensors 74 are utilized to detect inputs from the user 17 with respect to operation of various vehicle components. For example, in various embodiments, the input sensors 74 detect requests by the user 17 to remotely start the vehicle 12 and/or an environmental control system thereof, and/or requests as to a particular destination for travel for the vehicle 12, and so on. In certain embodiments, the input sensors 74 are part of and/or coupled to the electronic device 15 (e.g., a keyfob) and/or one or more of the hardware components 20 and/or controls 30, and/or to one or more other vehicle modules 80, such as one or more engine control modules 81, battery control modules 82, body control modules 83, environmental control modules 84, display modules 85 (e.g., providing audio and/or visual displays for the user 17), and/or other control modules that control different functionality for the vehicle 12, that may be connected to one another and to telematics unit 24 via the communications bus 62. For example, in various embodiments, the input sensors 74 may be part of and/or coupled to controls 30 for the electronic device 15 and/or to one or more hardware components 20 and/or various input devices 86 for use with other vehicle modules 80, such as one or more touch screens, push buttons, dials, switches, knobs, levers, or the like.

In various embodiments, the fuel sensors 75 measure a fuel level of the fuel 91 (e.g., of gasoline, diesel, or other fuel) for the vehicle 12, for use in determining when the vehicle 12 needs to be refueled. Also in various embodiments, the oil sensors 76 measure a level or quality of the oil 92 in the vehicle 12, for use in determining when the vehicle 12 needs to have oil added or its oil changed. In various embodiments, the temperature sensors 77 measure temperatures inside and outside the vehicle 12. Also in various embodiments, the voltage sensors 78 measure a voltage of one or more of the batteries 93 of the vehicle 12, for use in determining when the vehicle 12 needs to have its battery 93 recharged.

Also in various embodiments, the input sensors 74 are utilized to detect inputs from the user 17 with respect to operation of various vehicle components. For example, in various embodiments, the input sensors 74 detect requests by the user 17 to remotely start the vehicle 12 and/or an environmental control system thereof, and/or requests as to a particular destination for travel for the vehicle 12, and so on. In certain embodiments, the input sensors 74 are part of and/or coupled to the electronic device 15 (e.g., a keyfob) and/or one or more of the hardware components 20 and/or controls 30, and/or to one or more other vehicle modules 80, such as one or more engine control modules 81, battery control modules 82, body control modules 83, environmental control modules 84, display modules 85, and/or other control modules that control different functionality for the vehicle 12, that may be connected to one another and to telematics unit 24 via the communications bus 62. For example, in various embodiments, the input sensors 74 may be part of and/or coupled to controls 30 for the electronic device 15 and/or to one or more hardware components 20 and/or various input devices 86 for use other vehicle modules 80, such as one or more touch screens, push buttons, dials, switches, knobs, levers, or the like.

Also in certain embodiments, the telematics unit 24 analyzes the vehicle data received from the electronic device 15 and the various sensors 72. In addition, in various embodiments, the telematics unit 24 collects historical data pertaining to operation of the vehicle 12 by the user 17 (e.g., as obtained via a computer memory, such as memory 40 of the vehicle 12 and/or database 56 of the remote server 18, described below), and generates predictions for the user 17's needs based on the vehicle data and the historical data, using a machine learning model. Also in various embodiments, the telematics unit 24 provides instructions to perform various control actions for the vehicle 12, such as automatically starting the vehicle 12, starting an environmental control system 84 for the vehicle 12, and providing notifications for refueling the vehicle 12, changing the oil, charging the battery, and so on under appropriate circumstances, for example as described in greater detail further below in connection with the process 300 of FIG. 3.

In addition, in various embodiments, the telematics unit 24 may also provide other services, such as, by way of example: turn-by-turn directions and other navigation-related services provided in conjunction with the GPS chipset/component 42, emergency assistance services, information requests from the users of the vehicle 12 (e.g., regarding points of interest en route while the vehicle 12 is traveling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54 (e.g., including one or more processors), databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. In various embodiments, the database 56 of the remote server 18 comprises a computer memory that stores identifiers for the respective electronic devices 15 of the various users 17 that utilize the vehicle 12, along with a prior history of usage of the vehicle 12 by the user 17. Also in various embodiments, the database 56 may also store additional information such as, by way of example, subscriber profile records, subscriber behavioral patterns, or any other pertinent subscriber and/or user information. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

Figure 2:
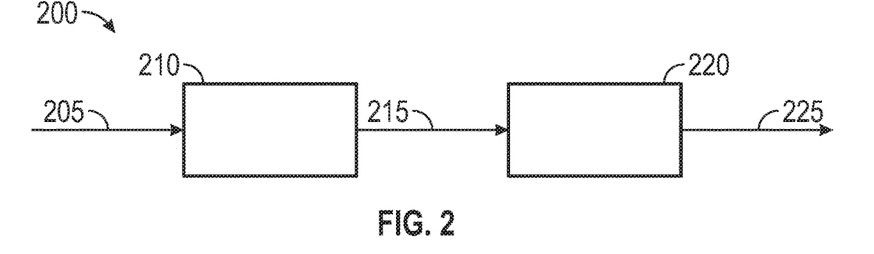
FIG. 2 is a block diagram of modules of the communications system of FIG. 1, in accordance with exemplary embodiments.

FIG. 2 provides a functional block diagram for modules of the communications system 10 of FIG. 1, in accordance with exemplary embodiments. In various embodiments, each module includes and/or utilizes computer hardware, for example via one or more computer processors and memory. As depicted in FIG. 2, in various embodiments, the communications system 10 generally includes a data module 210 and a processing module 220. In various embodiments, the data module 210 and processing module 220 are disposed, at least in part, onboard the vehicle 12. In certain embodiments, the processing module may be disposed, at least in part, as part of the remote server 18 of FIG. 1.

In various embodiments, the data module 210 collects vehicle data via the user 17's electronic device 15 and the sensors 72 of FIG. 1. In various embodiments, the data module 210 utilizes one or more detection sensors 73 of FIG. 1 (e.g., BLE sensors, in certain embodiments) that obtain an identifier and data from the electronic device 15. In addition, in certain embodiments, the data module 210 also utilizes one or more input sensors 74 of FIG. 1 for monitoring inputs provided by the user 17 (e.g., for requests by the user 17 to start the engine 90 and/or the environmental control system 84 of the vehicle 12, and/or a requested destination for travel for the vehicle 12, and so on). Also in various embodiments, the data module 210 collects temperature data comprising temperature of both (i) inside the vehicle 12 and (ii) ambient air directly outside the vehicle 12, via temperature sensors 77 of FIG. 1. In addition, in various embodiments, the data module 210 collects data pertaining to fuel levels (via the fuel sensors 75 of FIG. 1), oil levels and/or quality (via the oil sensors 76 of FIG. 1), and a voltage of the battery 93 of FIG. 1 (via the voltage sensors 78 of FIG. 1).

Also in various embodiments, the data module 210 collects historical data as to a prior history of operation of the vehicle 12 by the user 17 of FIG. 1 (e.g., as stored in the memory 40 of the vehicle 12 and/or the database 56 of the remote server 18 of FIG. 1).

In addition, in various embodiments, the data module 210 provides information pertaining to the collected vehicle data and the historical data as outputs 215 of the data module 210 for use by the processing module 220, for example as discussed below.

In various embodiments, the processing module 220 utilizes the data from the data module 210 (e.g., the vehicle data from the electronic device 15 and the vehicle sensors 72, and the historical data from the memory 40 of the vehicle 12 and/or the database 56 of the remote server 18) as inputs 215 for the processing module 220, and controls instructions for remote commands for the vehicle 12. Specifically, in various embodiments, the processing module 220 utilizes the vehicle data, the historical data as inputs for a machine learning module, generates predictions for user needs (e.g., as to stating the engine 90 or environmental control system 84 for the vehicle 12, and/or obtaining fuel 91 and/or oil 92 for the vehicle 12, and/or charging a battery 93 for the vehicle 12, and so on), and takes vehicle actions to accomplish these user needs (e.g., by automatically performing the needed vehicle actions and/or providing a notification for the user 17 to arrange for the performing of the needed vehicle actions). In various embodiments, these steps are performed by one or more processors (such as the processor 38 of the vehicle 12) using computer memory (e.g., the database/memory 56 of the remote server 18), for example in accordance with the process 300 described below in connection with FIG. 3. In certain embodiments, such instructions are provided by the processing module 220 as outputs 225 depicted in FIG. 2 to the one or more of the hardware components 20 and/or other vehicle modules 80 of FIG. 1 (e.g., an engine control module 81, battery control module 82, body control module 83, environmental control module 84, and so on) for controlling the one or more vehicle actions. one or more vehicle actions (e.g., controlling an engine remote start, an environmental control system, notifications to the user 17, and so on).

Figure 3:
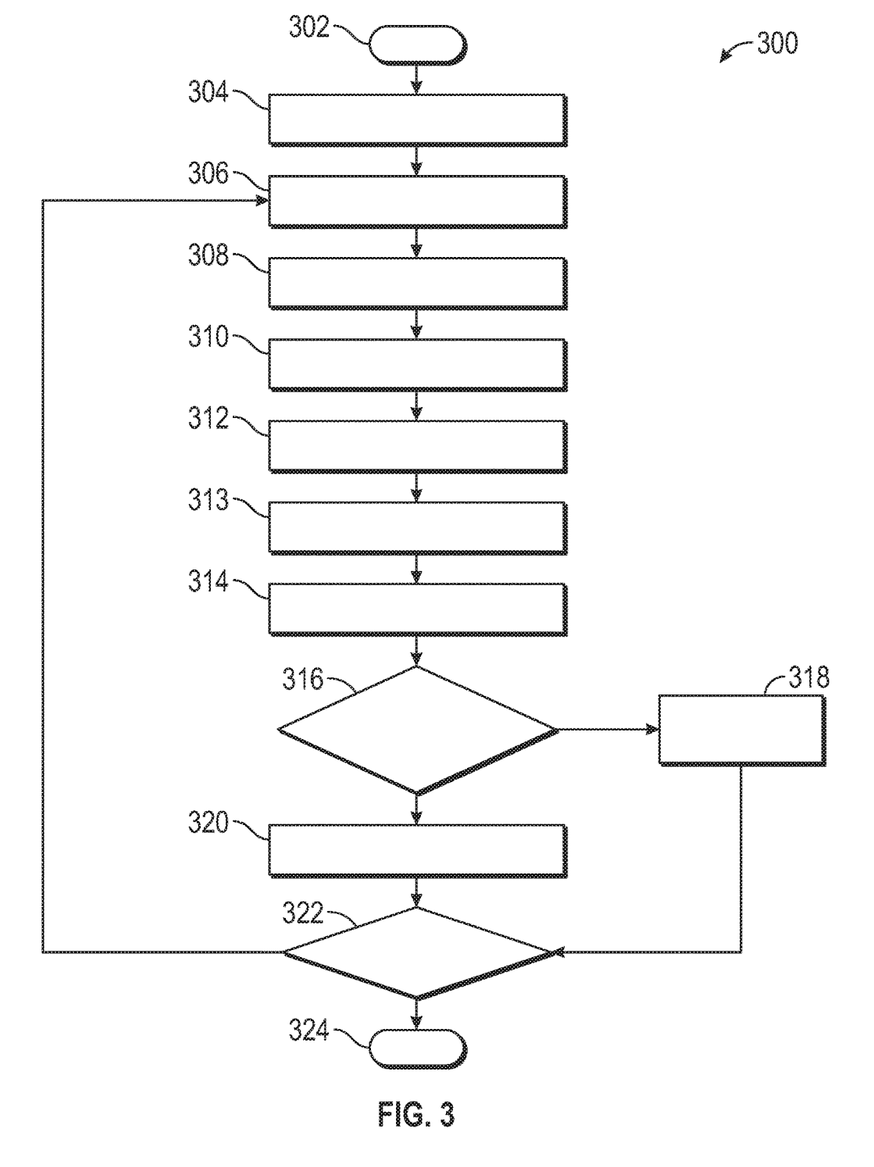
FIG. 3 is a flowchart of a process for executing remote commands for a vehicle, and that can be used in connection with the communications system of FIGS. 1 and 2, including the vehicle thereof of FIG. 1 and the modules of FIG. 2, in accordance with exemplary embodiments.

FIG. 3 is a flowchart of a process 300 for controlling remote commands for a vehicle, in accordance with various embodiments. In various embodiments, the process 300 can be used in connection with the communications system 10 of FIG, 1, including the vehicle 12 and the remote server 18 thereof, the components thereof of FIG. 1, and the modules thereof of FIG. 2, in accordance with exemplary embodiment.

As depicted in FIG. 3, in various embodiments the process 300 begins at step 302. In certain embodiments, the process 300 begins when one or more users 17 of the vehicle 12 approaches or enters the vehicle 12, when a user request has been received, and/or when a user request and/or use of the vehicle 12 is expected. In certain embodiments, the steps of the process 300 are performed continuously during operation of the vehicle 12.

In certain embodiments, an electronic device is detected at step 304. In various embodiments, one or more detection sensors 73 of FIG. 1 (e.g., one or more BLE sensors) detect one or more electronic devices 15 of the user 17, via the data module 210 of FIG. 2. In certain embodiments, a keyfob is detected by the detection sensors 73 inside the vehicle 12. In certain other embodiments, one or more other electronic devices (e.g., a phone, tablet, computer, wearable device, or the like) are detected inside the vehicle 12. In certain embodiments, step 304 represents a current detection of an electronic device 15 (e.g., a keyfob) that is presently within or in proximity to the vehicle 12. In certain other embodiments, step 304 represents a prior detection of an electronic device 15 from a most recent user operation of the vehicle 12.

In various embodiments, vehicle data is obtained at step 306. In certain embodiments, the obtained data pertains to various parameters associated with vehicle components and/or environmental conditions within the vehicle 12. In certain embodiments, the vehicle data pertains to a level of fuel 91 within the vehicle, a state of charge of a battery 93 of the vehicle 12, a level and/or quality measure of the oil 92 within the vehicle, and a temperature within the vehicle 12, among other possible values. In various embodiments, such values are measured and/or obtained via the data module 210 of FIG. 2 using applicable respective sensors 72 of FIG. 1 (e.g., fuel sensors 75, oil sensors 76, temperature sensors 77, and voltage sensors 78 of FIG. 1).

Also in certain embodiments, additional vehicle data is obtained at step 308. In certain embodiments, the additional vehicle data of step 308 pertains to data pertaining to one or more parameters associated with conditions surrounding the vehicle 12. In certain embodiments, the data of step 308 includes an ambient temperature for ambient air directly surrounding the vehicle 12. In various embodiments, such values are measured and/or obtained via the data module 210 of FIG. 2 using applicable respective sensors 72 of FIG. 1 (e.g., one or more temperature sensors 77 of FIG. 1).

Also in certain embodiments, one or more inputs are obtained at step 310. In certain embodiments, the inputs of step 310 pertain to one or more requests or other inputs from the user 17 of the vehicle 12, for example as communicated via the user 17's electronic device 15 and/or input devices 86 of FIG. 1. In certain embodiments, the inputs of step 310 include a user 17's request to remotely start an engine 90 and/or environmental control system 84 of the vehicle 12, and/or a request for an intended destination of travel for the vehicle 12, and so on. In various embodiments, such values are measured and/or obtained via the data module 210 of FIG. 2 using applicable respective sensors 72 of FIG. 1 (e.g., one or more input sensors 74 of FIG. 1).

In addition, in various embodiments, historical data is obtained at step 312. In certain embodiments, the historical data pertains to a particular user 17's operation of the vehicle 12 in previous vehicle drives (e.g., in previous ignition cycles for the vehicle 12). For example, in certain embodiments, the user history may include a history of dates of the week, times of day, and combinations thereof in which the user 17 has historically utilized the vehicle 12, along with a history of destinations in which the vehicle 12 has traveled to, and/or routes that the vehicle 12 has taken along the way. In certain embodiments, the historical data may include vehicle agnostic data, and/or may include a user history across different vehicles (e.g., if a user owns different vehicles and/or leases different vehicles at different points in time, and so on). In certain embodiments, the historical data may apply to the vehicle 12 without regard to a particular user (e.g., as to the vehicle 12's history, without regard to any particular user), and/or may apply to a particular user 17 without regard to the vehicle 12 (e.g., across different vehicles), among other possible variations. Also in various embodiments, the historical data is stored in a computer memory, such as the memory 40 of the vehicle 12 of FIG. 1 and/or the database 56 of the remote server 18 of FIG. 1.

In various embodiments, at step 313, the various data, inputs, and information of steps 304-312 are provided to a machine learning model. In various embodiments, the machine learning model is stored in a computer memory (such as the memory 40 of the vehicle 12 of FIG. 1 and/or the database 56 of the remote server 18 of FIG. 1), and the processing module 220 of FIG. 2 provides the various data, inputs, and information of steps 304-312 as inputs to the machine learning module via a computer processor (such as the processor 38 of the vehicle 12 of FIG. 1 and/or the server 54 of the remote server 18 of FIG. 1).

At step 314, various predictions are made using the machine learning model. Specifically, in various embodiments, predictions are made by the processing module 220 of FIG. 2 (e.g., via the processor 38 of the vehicle 12 of FIG. 1 and/or the server 54 of the remote server 18 of FIG. 1) as to one or more needs of the user 17 with respect to the vehicle 12, using the machine learning model of step 313 and based on the various information of steps 304-312 (including the vehicle data and the historical data).

For example, in certain embodiments, predictions are made as to when the user 17 will next be using the vehicle 12, based on a driving history of the user 17 and/or the vehicle 12 (e.g., including days of the week and times of day that the user 17 typically operates the vehicle and/or an amount of time for which the vehicle 12 is typically parked at a particular location, and so on). Also in certain embodiments, predictions are made as to whether the environmental control system 84 of FIG. 1 should be activated, for example based on a difference between an internal temperature of the vehicle 12 versus an ambient temperature outside the vehicle 12, and/or based on whether the vehicle 12 is presently parked in a parking garage. For example, in certain embodiments, it is predicted that an environmental control system 84 should be activated if the user 17 is about to again use the vehicle 12, provided that both (i) a difference between an interior temperature of the vehicle 12 and the surrounding temperature outside the vehicle 12 is greater than a predetermined threshold and (ii) the vehicle 12 is currently parked outdoors, and not in a garage.

In addition, in certain embodiments, predictions are made as to a target destination for the vehicle 12 (e.g., based on the inputs of step 310 and/or the historical data of step 312), and as to whether a particular action is required or recommended for the vehicle 12 to successfully reach the target destination. For example, in certain embodiments, determinations are made as to whether the vehicle 12 is likely to require refueling, the addition of oil and/or changing of oil, a charging of the battery, and one or more other vehicle actions, for example based on a current state of the vehicle 12's fuel, oil, and battery charge, either alone or in combination with a distance to the target destination and/or related information. In certain embodiments, the predictions may be vehicle agnostic. In certain embodiments, the predictions may be based on the vehicle (e.g., with one or multiple users), based on the user (e.g., across one or multiple vehicles), or both. For example, predictions may be made with respect to user-owned vehicles as well as rented and/or leased vehicles. In addition, in certain embodiments, the refinement of the machine learning model may be performed on the device locally (e.g., on the vehicle 12) and/or remotely (e.g., at the remote server 18). In certain embodiments in which the machine learning model is refined at the remote server 18 (e.g., in the cloud), the results may be pushed to the device for updating.

At step 316, a determination is made as to whether any vehicle actions are needed. Specifically, in various embodiments, determinations are made by the processing module 220 of FIG. 2 (e.g., via the processor 38 of the vehicle 12 of FIG. 1 and/or the server 54 of the remote server 18 of FIG. 1) as to whether any vehicle actions are needed, based on the predictions of step 314.

If it is determined at step 316 that one or more vehicle actions are required, then appropriate actions are performed correspondingly at step 318. In various embodiments, the processing module 220 of FIG. 2 (e.g., via the processor 38 of the vehicle 12 of FIG. 1 and/or the server 54 of the remote server 18 of FIG. 1) provides instructions for the vehicle 12, and/or one or more systems and/or components thereof (such as one or more of the hardware components 20 and/or the other vehicle modules 80 of FIG. 1) to implement the vehicle actions.

For example, in certain embodiments, instructions are provided to start the engine 90 of the vehicle 12 about when it is predicted that the user 17 will next be using the vehicle 15. Also in certain embodiments, instructions are provided for starting the engine 90 and controlling the environmental control system 84 (e.g., by turning on the environmental control system 84, adjusting a temperature and/or fan setting, and the like) of the vehicle 12 about when it is predicted that the user 17 will next be using the vehicle 15. For example, in one such embodiment, instructions are provided for starting the engine 90 of the vehicle 12 and controlling the environmental control system 84 for the vehicle 12 to attain a desired temperature inside the vehicle 12 based on a current temperature inside the vehicle 12 and an external temperature immediately surrounding the vehicle 12, about when it is predicted that the user will next be using the vehicle. In certain embodiments, a determination is made as to whether the vehicle 12 is disposed inside a garage (e.g., based on GPS data and/or temperature data comparing temperatures inside versus outside the vehicle 12), and the instructions for starting the engine 90 of the vehicle 12 and controlling the environmental control system 84 for the vehicle 12 are provided only if the vehicle 12 is not disposed inside a garage.

In addition, in certain embodiments, the one or more actions are based at least in part on the target destination for the vehicle 12. For example, in certain embodiments, a notification is provided (e.g., via instructions provided to the display 85 of FIG. 1 for an audio and/or visual notification for the user 17) recommending a fuel refuel if a current amount of fuel 91 in the vehicle 12 is believed to not be enough to reach the target destination. By way of further example, in certain embodiments, a notification is provided (e.g., via instructions provided to the display 85 of FIG. 1 for an audio and/or visual notification for the user 17) recommending a battery charge if a current state of charge of the battery 93 of the vehicle 12 is believed to not be enough to reach the target destination. By way of further example, in certain embodiments, a notification is provided (e.g., via instructions provided to the display 85 of FIG. 1 for an audio and/or visual notification for the user 17) for an oil fill and/or an oil change if the current oil level and oil quality is deemed to be inadequate in general and/or inadequate for reaching the target destination, among other possible notifications and/or other actions. In addition, in certain embodiments, notifications may be provided via a mobile application (e.g., including notifications/reminders to the user 17 on the user's smart phone and/or other device before the user 17 even enters the vehicle 12, in certain embodiments).

Conversely, if it is determined at step 316 that no action is required, then no action is taken at step 320.

Following steps 318 and/or 320, in various embodiments, a determination is made at step 322 as to whether the process 300 is to continue. If it is determined in step 322 that the process is to continue (e.g., in certain embodiments, if the vehicle drive is still ongoing), then the process returns to step 306. Conversely, once it is determined during an iteration of step 322 that the process need not continue further (e.g., in certain embodiments, if the vehicle drive is complete), then the process terminates at 324.

Accordingly, in accordance with various embodiments, methods, systems, and vehicles are provided that provide for automated, remote vehicle actions. In various embodiments, the vehicle actions are provided based on predictions, via a machine learning model, that anticipate a user's needs based on vehicle data (including data as to parameters within the vehicle and outside the vehicle) in combination with historical data pertaining to prior usage of the vehicle.

It will be appreciated that the systems and methods may vary from those depicted in the Figures and described herein. For example, the communications system of FIG. 1, including the remote server, the vehicles, communications networks, and/or components thereof, may vary from that depicted in FIG. 1 and/or described herein, in various embodiments. It will similarly be appreciated that the modules may vary from the depictions in FIG. 2 and the accompanying descriptions. It will also be appreciated that the process (and/or subprocesses) disclosed herein may differ from those described herein and/or depicted in FIG. 3, and/or that steps thereof may be performed simultaneously and/or in a different order as described herein and/or depicted in FIG. 3, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   obtaining vehicle data pertaining to one or more conditions of a vehicle;
   obtaining historical data pertaining to a user's operation of the vehicle;
   generating one or more predictions of one or more needs for the user, via a processor, using the vehicle data and the historical data as inputs for a machine learning model;
   providing instructions, via the processor, to implement a vehicle action that accomplishes the one or more needs for the user based on the generated predictions via the machine learning model;
   determining a target destination for the vehicle;
   determining, using the vehicle data, whether a particular vehicle action is required for the vehicle to reach the target destination; and
   providing a notification, to the user, recommending performance of the vehicle action, when it is determined that the particular vehicle action is required for the vehicle to reach the target destination.

2. The method of claim 1, wherein:
   the step of obtaining the historical data comprises obtaining a driving history for the user;
   the step of generating one or more predictions comprises predicting when the user will next be using the vehicle, based on the driving history; and
   the step of providing the instructions comprises providing the instructions, to implement the vehicle action, about when it is predicted that the user will next be using the vehicle.

3. The method of claim 2, wherein the step of providing the instructions comprises providing instructions for starting an engine of the vehicle and controlling an environmental control system for the vehicle, about when it is predicted that the user will next be using the vehicle.

4. The method of claim 3, wherein:
   the step of obtaining the vehicle data comprises obtaining an external temperature that is external to the vehicle; and
   the step of providing the instructions comprises providing instructions for starting the engine of the vehicle and controlling the environmental control system for the vehicle to attain a desired temperature inside the vehicle based on the external temperature, about when it is predicted that the user will next be using the vehicle.

5. The method of claim 3, further comprising:
   determining whether the vehicle is disposed inside a garage, based on the vehicle data;
   wherein the step of providing the instructions comprises providing instructions for starting the engine of the vehicle and controlling the environmental control system for the vehicle, only if the vehicle is not disposed inside the garage.

6. The method of claim 1, wherein the step of determining the target destination comprises determining the target destination based on the historical data.

7. The method of claim 1, wherein:
   the step of determining whether the vehicle action is required comprises determining whether a fuel refill is required for the vehicle to reach the target destination; and
   the step of providing the notification comprises notifying the user that the fuel refill is recommended, when it is determined that the fuel refill is required for the vehicle to reach the target destination.

8. The method of claim 1, wherein:
the step of determining whether the vehicle action is required comprises determining whether a battery charge is required for the vehicle to reach the target destination; and
the step of providing the notification comprises notifying the user that the battery charge is recommended, when it is determined that the battery charge is required for the vehicle to reach the target destination.

9. A system comprising:
a data module configured to at least facilitate:
obtaining vehicle data pertaining to one or more conditions of a vehicle; and
obtaining historical data pertaining to a user's operation of the vehicle; and
a processing module that is coupled to the data module and configured to at least facilitate, via a processor:
generating one or more predictions of one or more needs for the user, via a processor, using the vehicle data and the historical data as inputs for a machine learning model;
providing instructions, via the processor, to implement a vehicle action that accomplishes the one or more needs for the user based on the generated predictions via the machine learning model;
determining a target destination for the vehicle;
determining, using the vehicle data, whether a particular vehicle action is required for the vehicle to reach the target destination; and
providing a notification, to the user, recommending performance of the vehicle action, when it is determined that the particular vehicle action is required for the vehicle to reach the target destination.

10. The system of claim 9, wherein:
the data module is configured to at least facilitate obtaining a driving history for the user; and
the processing module is configured to at least facilitate:
predicting when the user will next be using the vehicle, based on the driving history; and
providing the instructions, to implement the vehicle action, about when it is predicted that the user will next be using the vehicle.

11. The system of claim 10, wherein the processing module is configured to at least facilitate providing instructions for starting an engine of the vehicle and controlling an environmental control system for the vehicle, about when it is predicted that the user will next be using the vehicle.

12. The system of claim 11, wherein:
the data module is configured to at least facilitate obtaining an external temperature that is external to the vehicle; and
the processing module is configured to at least facilitate providing the instructions for starting the engine of the vehicle and controlling the environmental control system for the vehicle to attain a desired temperature inside the vehicle based on the external temperature, about when it is predicted that the user will next be using the vehicle.

13. The system of claim 11, wherein the processing module is configured to at least facilitate:
determining whether the vehicle is disposed inside a garage, based on the vehicle data; and
providing the instructions for starting the engine of the vehicle and controlling the environmental control system for the vehicle, only if the vehicle is not disposed inside the garage.

14. The system of claim 9, wherein the processing module is configured to at least facilitate determining the target destination based on the historical data.

15. The system of claim 9, wherein the processing module is configured to at least facilitate:
determining whether a fuel refill is required for the vehicle to reach the target destination; and
notifying the user that the fuel refill is recommended, when it is determined that the fuel refill is required for the vehicle to reach the target destination.

16. The system of claim 9, wherein the processing module is configured to at least facilitate:
determining whether a battery charge is required for the vehicle to reach the target destination; and
notifying the user that the battery charge is recommended, when it is determined that the battery charge is required for the vehicle to reach the target destination.

17. A vehicle system comprising:
a sensor configured to at least facilitate obtaining vehicle data pertaining to one or more conditions of the vehicle;
a memory configured to at least facilitate storing historical data pertaining to a user's operation of the vehicle; and
a processor that is coupled to the sensor and the memory, and that is configured to at least facilitate:
generating one or more predictions of one or more needs for the user, using the vehicle data and the historical data as inputs for a machine learning model;
providing instructions to implement a vehicle action that accomplishes the one or more needs for the user based on the generated predictions via the machine learning model determining a target destination for the vehicle;
determining, using the vehicle data, whether a particular vehicle action is required for the vehicle to reach the target destination; and
providing a notification, to the user, recommending performance of the vehicle action, when it is determined that the particular vehicle action is required for the vehicle to reach the target destination.

18. The vehicle system of claim 17, wherein:
the memory is configured to at least facilitate storing a driving history for the user; and
the processor is configured to at least facilitate:
predicting when the user will next be using the vehicle, based on the driving history; and
providing instructions for starting an engine of the vehicle and controlling an environmental control system for the vehicle, about when it is predicted that the user will next be using the vehicle, about when it is predicted that the user will next be using the vehicle.

* * * * *